(12) United States Patent
Tanoue (10) Patent No.: US 10,760,757 B2
(45) Date of Patent: Sep. 1, 2020

(54) VEHICLE LAMP

(71) Applicant: TOYOTA JIDOSHA KABUSHIKI KAISHA, Toyota-shi, Aichi-ken (JP)

(72) Inventor: Shingo Tanoue, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/373,698

(22) Filed: Apr. 3, 2019

(65) Prior Publication Data

US 2019/0309919 A1 Oct. 10, 2019

(30) Foreign Application Priority Data

Apr. 9, 2018 (JP) ................................ 2018-074565

(51) Int. Cl.
| F21S 41/143 | (2018.01) |
| F21S 41/24 | (2018.01) |
| F21S 41/32 | (2018.01) |
| B60Q 1/04 | (2006.01) |
| F21S 43/37 | (2018.01) |
| F21S 43/247 | (2018.01) |
| F21S 43/237 | (2018.01) |
| F21S 43/40 | (2018.01) |
| F21S 43/245 | (2018.01) |
| F21W 103/20 | (2018.01) |

(52) U.S. Cl.
CPC ............. *F21S 41/143* (2018.01); *B60Q 1/04* (2013.01); *F21S 41/24* (2018.01); *F21S 41/32* (2018.01); *F21S 43/237* (2018.01); *F21S 43/245* (2018.01); *F21S 43/247* (2018.01); *F21S 43/37* (2018.01); *F21S 43/40* (2018.01); *F21W 2103/20* (2018.01)

(58) Field of Classification Search
CPC .......... F21S 41/143; F21S 41/24; F21S 41/32; B60Q 1/04
See application file for complete search history.

(56) References Cited

U.S. PATENT DOCUMENTS

| 6,107,916 A | 8/2000 | Beck et al. | |
| 10,400,981 B1 * | 9/2019 | Kingen | F21S 43/30 |
| 2002/0181236 A1 | 12/2002 | Aoki | |
| 2005/0141213 A1 | 6/2005 | Gasquet | |
| 2013/0208502 A1 * | 8/2013 | Nakayama | G02B 6/0018 362/608 |
| 2014/0056015 A1 | 2/2014 | Martoch et al. | |

(Continued)

FOREIGN PATENT DOCUMENTS

| EP | 1 826 475 A1 | 8/2007 |
| JP | 2002-324418 A | 11/2002 |

(Continued)

*Primary Examiner* — Donald L Raleigh
(74) *Attorney, Agent, or Firm* — Oliff PLC (57) ABSTRACT

An Fr turn lamp that is a vehicle lamp includes a first light guide and a second light guide. The first light guide is disposed in front of a light source in the direction of an optical axis. The second light guide has a connection end connected to a vehicle width direction outer side surface of the first light guide and extends outward in the vehicle width direction from the connection end. The first light guide has a reflecting surface configured to reflect a part of incident light from the light source toward the connection end of the second light guide.

7 Claims, 7 Drawing Sheets

(56) References Cited

U.S. PATENT DOCUMENTS

| | | | |
|---|---|---|---|
| 2014/0192546 A1* | 7/2014 | Kumar | B60Q 1/00 362/521 |
| 2014/0211493 A1* | 7/2014 | Ichikawa | F21V 7/0025 362/511 |
| 2014/0247616 A1* | 9/2014 | Arrivet | B60Q 1/0052 362/511 |
| 2016/0103269 A1* | 4/2016 | Narita | G02B 6/00 362/617 |
| 2016/0138772 A1* | 5/2016 | Sato | G02B 6/0036 362/511 |
| 2016/0146441 A1* | 5/2016 | Mochizuki | B60Q 1/0041 315/77 |
| 2016/0195234 A1* | 7/2016 | Mateju | A61N 1/0468 362/511 |
| 2016/0245974 A1* | 8/2016 | Osaka | F21S 43/239 |
| 2016/0290584 A1 | 10/2016 | Nomura et al. | |
| 2017/0067615 A1* | 3/2017 | Okura | F21V 7/09 |
| 2017/0089540 A1* | 3/2017 | Sagna | F21S 43/14 |
| 2017/0234501 A1* | 8/2017 | Hanami | G02B 6/001 362/511 |
| 2017/0261168 A1* | 9/2017 | Edletzberger | F21S 41/24 |
| 2017/0267163 A1* | 9/2017 | Watanabe | F21S 43/40 |
| 2019/0293256 A1* | 9/2019 | Crompvoets | F21S 43/241 |

FOREIGN PATENT DOCUMENTS

| | | | | |
|---|---|---|---|---|
| JP | 2015-103362 A | | 6/2015 | |
| JP | 2015/159049 | * | 9/2015 | F21S 43/249 |
| JP | 2016-091846 A | | 5/2016 | |
| JP | 2016-197523 A | | 11/2016 | |

* cited by examiner

VEHICLE LAMP

CROSS REFERENCE TO RELATED APPLICATION

This application claims priority to Japanese Patent Application No. 2018-074565 filed on Apr. 9, 2018, which is incorporated herein by reference in its entirety including the specification, claims, drawings, and abstract.

TECHNICAL FIELD

The present disclosure relates to a vehicle lamp.

BACKGROUND

Conventionally, it is known that a light guide is connected to a vehicle lamp such as a headlamp and is caused to emit light by a part of light emitted from a light source, thereby improving design (decorativeness).

For example, in JP 2015-103362 A, the directivity of the light distribution of a light source is converted by a reflector (for example, the irradiation range of light emitted from the light source is expanded), and the converted light is emitted forward in the direction of an optical axis. An introduction portion of the light guide is provided on the side of the reflector; that is, at an end portion in a left and right direction. Further, a part of light emitted from the reflector is incident on the introduction portion. In addition, in JP 2002-324418 A, a notch portion is provided in a reflector and leakage light from the notch portion is sent to a light guide.

SUMMARY

Incidentally, the shape of the reflecting surface of the reflector is essentially determined so that light from the light source is irradiated forward in the direction of the optical axis. Further, the reflector is designed so that the leakage light to the side of the reflector is suppressed. Therefore, the light amount of the leakage light to the side cannot be sufficiently secured and light may fail to reach the entire light guide.

Accordingly, the present disclosure aims to provide a vehicle lamp that allows light emitted from a light source to reach a light guide more reliably than in the prior art.

The present disclosure provides a vehicle lamp including a light source which has an optical axis provided along a vehicle longitudinal direction. The vehicle lamp includes a first light guide and a second light guide. The first light guide is disposed in front of the light source in the direction of the optical axis. The first light guide has a lens surface which is opposed to the light source and formed at the rear end in the direction of the optical axis. The first light guide also has a light emission surface which is formed at the front end in the direction of the optical axis. The second light guide has a connection end connected to a vehicle width direction outer side surface of the first light guide and extends outward in the vehicle width direction from the connection end. The second light guide has a reflecting surface which is formed at the rear in a vehicle longitudinal direction, and a light emission surface which is formed at the front in the vehicle longitudinal direction. The first light guide has a reflecting surface configured to reflect a part of incident light from the light source toward the connection end of the second light guide.

According to the present disclosure, the light in the first light guide is reflected by the reflecting surface and is incident on the second light guide. In this way, the light is positively made incident on the second light guide by providing the reflecting surface, so that the light can reliably reach the second light guide.

Further, in the present disclosure, the reflecting surface may be buried in the first light guide from the side end of the first light guide in the vehicle width direction.

For example, when the reflecting surface is provided at the center of the first light guide in the vehicle width direction, there is a possibility that the light emitted from the light emission surface of the first light guide is bifurcated and emitted from the reflecting surface. However, since the reflecting surface is buried in the first light guide from the side end in the vehicle width direction, a single light flux can be emitted from the light emission surface.

Further, in the present disclosure, the second light guide may be connected to a side surface of the first light guide on the lens surface side.

When the second light guide is disposed on the lens surface side of the first light guide; that is, at the rear of the first light guide, leakage light from the side surface of the first light guide is not incident on the second light guide. As a result, the second light guide is prevented from being divided into a region which emits light from the reflecting surface and the leakage light, and a region which emits light only from the reflecting surface. In this way, it is possible to emit light without unevenness as a whole.

Further, in the present disclosure, the second light guide may be connected to a side surface of the first light guide on the light emission surface side.

When the second light guide is disposed on the light emission surface side of the first light guide; that is, at the front of the first light guide, the second light guide emits light further forward of the vehicle, and a high light design effect can be obtained.

According to the present disclosure, the light emitted from the light source can reach the light guide more reliably than in the prior art.

BRIEF DESCRIPTION OF DRAWINGS

Embodiment(s) of the present disclosure will be described by reference to the following figures, wherein:

FIG. 5 is a sectional view taken along the line A-A, illustrating a state when a light source is turned on;

DESCRIPTION OF EMBODIMENTS

A vehicle lamp according to the present embodiment will be described with reference to FIGS. 1 to 7. Meanwhile, in FIGS. 1 to 7, the front and rear direction of a vehicle (hereinafter, appropriately referred to as "vehicle longitudinal direction") is indicated by an axis represented by a symbol FR, the width direction of the vehicle (hereinafter, appropriately referred to as "vehicle width direction") is indicated by an axis represented by a symbol LW, and the vertical direction (hereinafter, appropriately referred to as "vehicle height direction") is indicated by an axis represented by a symbol UP. The symbol FR stands for Front, and the forward direction of a vehicle is defined as the positive direction of the vehicle longitudinal direction axis FR. The symbol LW stands for Left Width, and the left direction of the vehicle width is defined as the positive direction of the vehicle width direction axis LW. Further, the upward direction is defined as the positive direction of the vehicle height direction axis UP.

Figure 1:
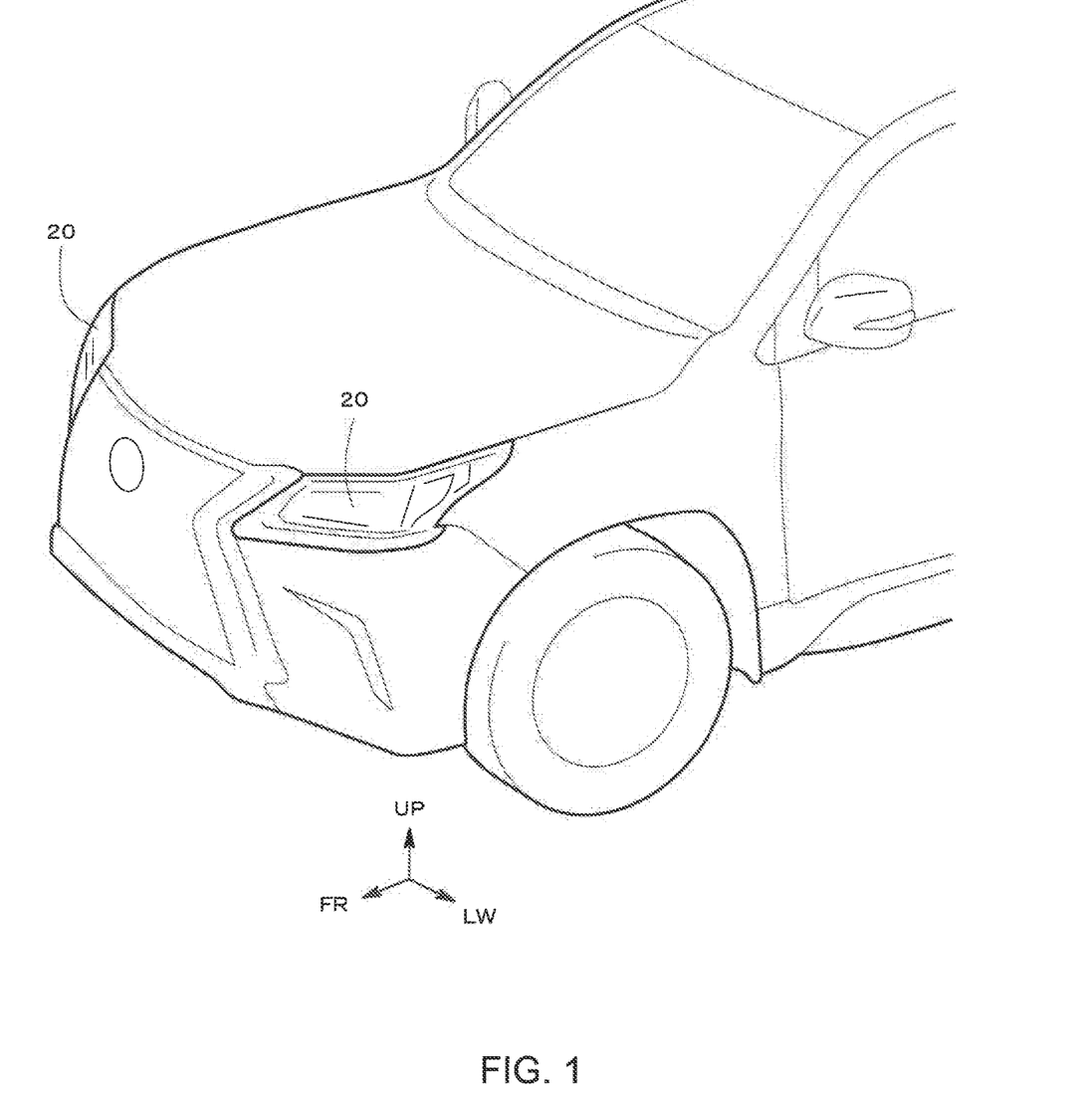
FIG. 1 is a front perspective view illustrating a vehicle on which a vehicle lamp according to the present embodiment is mounted.

FIG. 1 illustrates a front perspective view of a vehicle on which a vehicle lamp according to the present embodiment is mounted. The vehicle lamp according to the present embodiment is configured as a part of a headlamp unit 20 that is a headlight unit of the vehicle.

Figure 2:
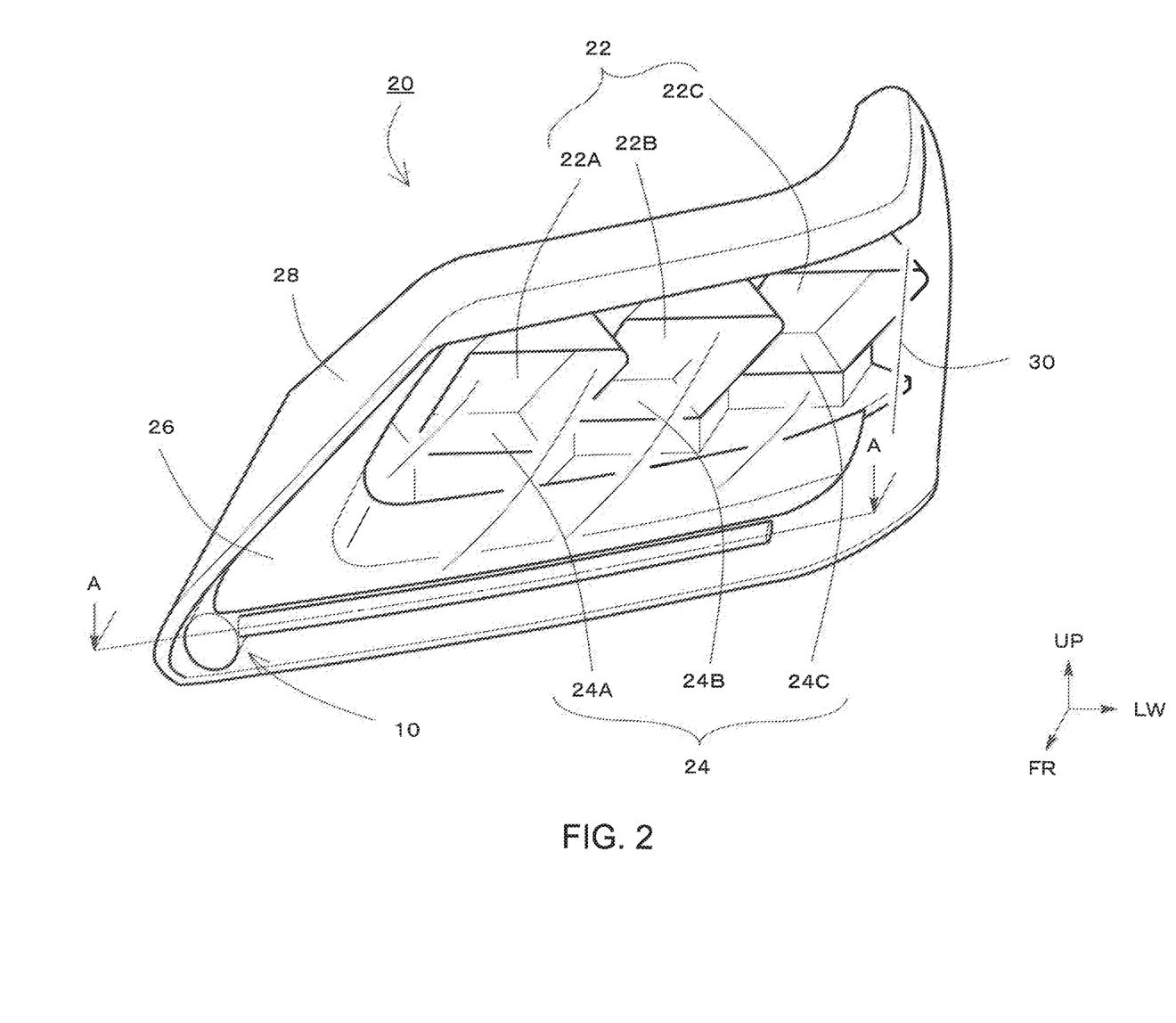
FIG. 2 is a perspective view illustrating a headlamp unit on which the vehicle lamp according to the present embodiment is mounted.

FIG. 2 illustrates the headlamp unit 20. Meanwhile, the headlamp unit 20 illustrated in FIG. 2 is provided on the right side as viewed from the front of the vehicle. However, due to the symmetry of the vehicle design, the headlamp unit 20 on the left side as viewed from the front of the vehicle has the same structure as in FIG. 2.

The headlamp unit 20 includes a high-beam headlamp 22, a low-beam headlamp 24, and a clearance lamp 26. The headlamp unit 20 further includes a front turn signal lamp that is a vehicle lamp 10 of the present embodiment. These lamps are accommodated in a housing 28 provided at the rear in the vehicle longitudinal direction and an outer lens 30 provided at the front in the vehicle longitudinal direction.

Meanwhile, the vehicle lamp 10 according to the present embodiment may be applied to lamps other than the front turn signal lamp. However, since a second light guide 13 (to be described later) extending outward in the vehicle width direction is provided, the turning direction of the vehicle becomes clear. Therefore, it has the advantage to use the vehicle lamp 10 according to the present embodiment as the front turn signal lamp. Hereinafter, the vehicle lamp 10 mounted as the front turn signal lamp is referred to as "Fr turn lamp 10."

Three high-beam headlamps 22 (headlights for running) and three low-beam headlamps 24 (headlights for passing) are provided in the vehicle width direction, for example. For example, three LEDs 22A, 22B, 22C (light emitting diodes) are mounted as a light source of the high-beam headlamp 22, and three LEDs 24A, 24B, 24C are mounted as a light source of the low-beam headlamp 24.

The substantially L-shaped clearance lamp 26 (side lamp) is provided to extend from the inner side in the vehicle width direction of the high-beam headlamp 22 and the low-beam headlamp 24 downward in the vehicle height direction. For example, an LED is mounted as a light source of the clearance lamp 26.

Figure 3:
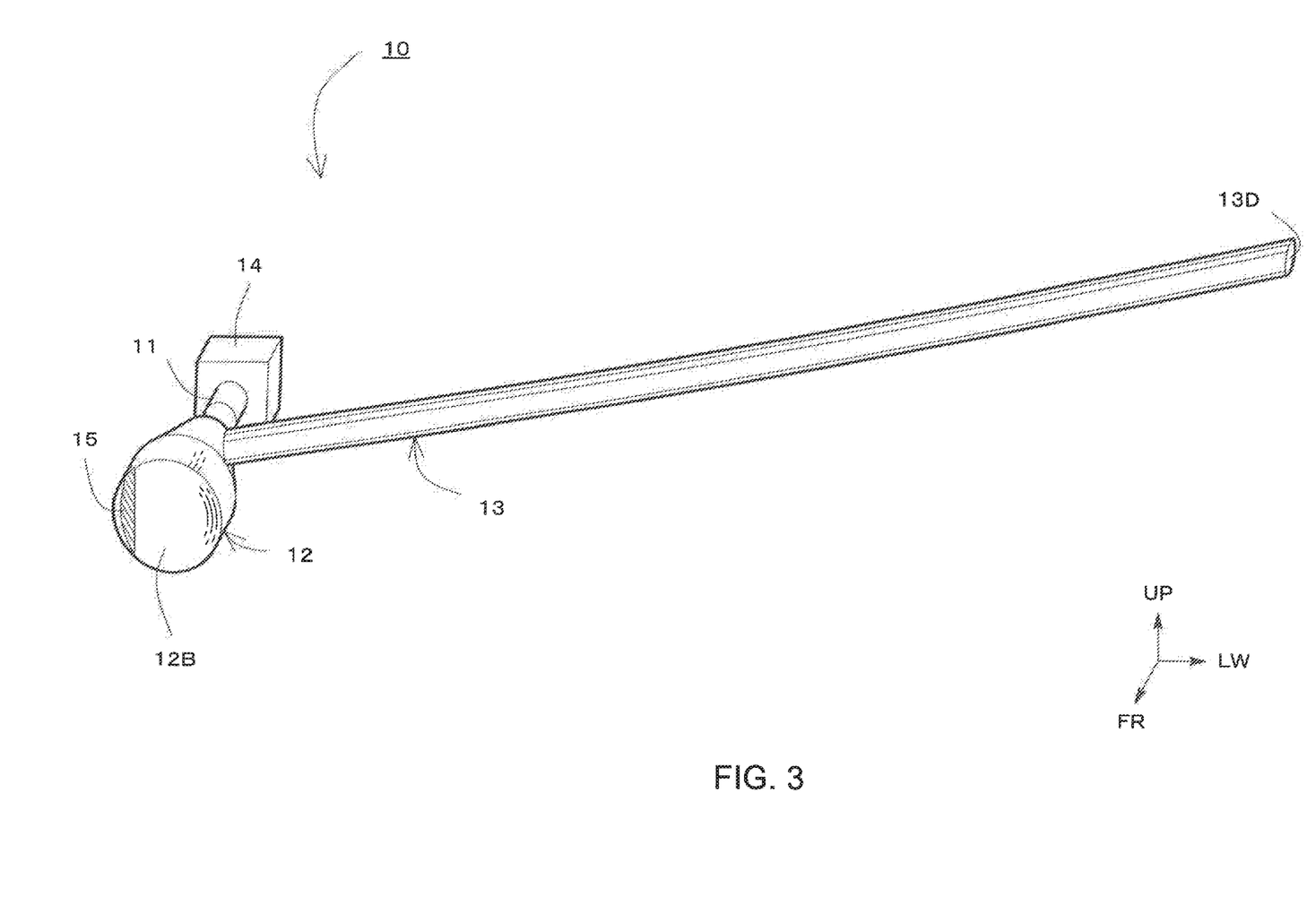
FIG. 3 is a perspective view illustrating the vehicle lamp according to the present embodiment.
Figure 4:
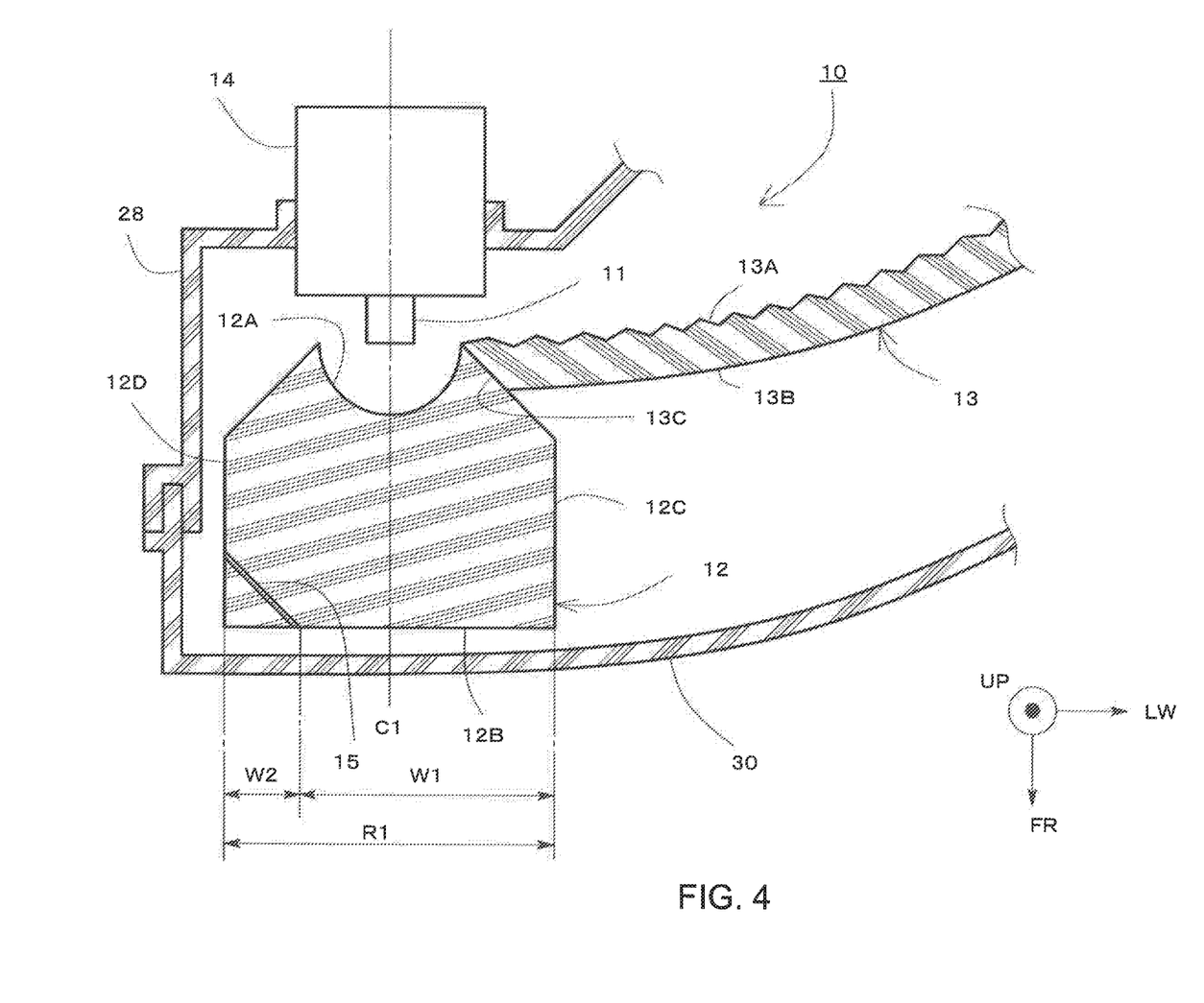
FIG. 4 is a sectional view taken along the line A-A in FIG. 2.

The Fr turn lamp 10 (vehicle lamp) is provided below the clearance lamp 26. FIG. 3 illustrates a perspective view of the Fr turn lamp 10. Further, FIG. 4 illustrates a sectional view taken along the line A-A around the Fr turn lamp 10 in FIG. 2. The Fr turn lamp 10 includes a light source 11, a first light guide 12, the second light guide 13, and a socket 14.

The socket 14 is a power supply member which is fixed to the housing 28 and into which the light source 11 is inserted. A wire (not shown) is drawn out at the rear of the socket 14 in the vehicle longitudinal direction and connected to a battery of the vehicle. For example, the socket 14 may have one insertion port.

An optical axis C1 of the light source 11 is provided along (parallel to) the vehicle longitudinal direction (FR axis). For example, the light source 11 is configured by an LED bulb (light bulb). From the viewpoint of reducing the environmental burden, for example, an LED bulb of a single lamp socket configured by a single LED chip is used as the light source 11. Further, the light source 11 can blink in response to the operation of a turn signal lever (winker lever) provided on a steering column (not shown).

When the LED bulb of the single lamp socket is used as the light source 11, the environmental burden can be reduced. For example, according to CAFE (Corporate Average Fuel Economy) that is a fuel efficiency standard in the United States, the average fuel efficiency of the whole vehicles sold by one company is calculated, which becomes the standard of regulation. Here, a value called "credit" is given to a vehicle equipped with an idling stop function or a high-efficiency LED or the like that is a technology with low environmental burden, and the value of CAFE can be lowered according to the total value thereof.

For example, in the case of the Fr turn lamp, it is known that the credit is given when the power consumption on one side can be suppressed to 6.9 W or less. Therefore, the LED bulb of the single lamp socket with 6.9 W or less may be used as the light source 11.

Unlike a light source such as a halogen lamp whose light emission range extends over 360°; that is, which has no directivity, the LED itself has strong directivity around the optical axis C1. In other words, the spread from the optical axis C1 that serves as an illumination center is small. Here, according to the regulations or the like, the Fr turn lamp 10 is required to illuminate light with a spreading surface to a certain degree. In order to satisfy this, the first light guide 12 is provided in front of the light source 11 in the direction of the optical axis C1.

The first light guide 12 may be regarded as a light guide provided with a lens surface 12A; that is, a light guide with a lens. The first light guide 12 is made of a translucent material such as acrylic or quartz, for example. By referring to FIG. 3, for example, the first light guide 12 is configured to have a shape in which a column and a truncated cone are combined.

The first light guide 12 is configured such that the lens surface 12A is formed at the rear end in the direction of the optical axis C1. The lens surface 12A faces the light source 11 along the optical axis C1. Therefore, the light emitted from the light source 11 is incident on the lens surface 12A. The lens surface 12A may be, for example, a concave lens. The light incident on the lens surface 12A is diffused into the first light guide 12. Meanwhile, focusing attention on this lens surface 12A, the first light guide 12 can also be referred to as an inner lens in relation to the outer lens 30 of the headlamp unit 20.

Further, the first light guide 12 is configured such that a light emission surface 12B facing the lens surface 12A is formed at the front end in the direction of the optical axis C1. The light emission surface 12B may be a flat surface without irregularities. The light diffused in the first light guide 12 is emitted from the light emission surface 12B. The lens surface 12A and the light emission surface 12B are connected by a side surface. As illustrated in FIG. 3, the first light guide 12 is configured to have a shape in which a column and a truncated cone are combined, so that the side surface is the outer peripheral surface of the column and the truncated cone.

The first light guide 12 is provided with a reflecting surface 15. The reflecting surface 15 reflects a part of the incident light incident on the first light guide 12 from the light source 11 toward a connection end 13C of the second light guide 13. For example, the reflecting surface 15 is buried in the first light guide 12. As illustrated in FIG. 4, the reflecting surface 15 extends from a vehicle width direction inner surface 12D. Specifically, as illustrated in FIG. 4, the reflecting surface 15 extends from the vehicle width direction inner surface 12D on the light emission surface 12B side; that is, from the front side to the light emission surface 12B.

For example, a plate member whose surface is plated and mirror-finished is buried in the first light guide 12. This surface becomes the reflecting surface 15. For example, the light incident on the reflecting surface 15 is totally reflected.

The reflecting surface 15 is oriented to the connection end 13C of the second light guide 13 with the first light guide 12. Therefore, the light reflected by the reflecting surface 15 is incident on the second light guide 13 from the connection end 13C. In this manner, in the present embodiment, the light in the first light guide 12 is positively made incident on the second light guide 13 by using the reflecting surface 15. As a result, it is possible to spread the light over the entire width of the second light guide 13.

Further, when the reflecting surface 15 is disposed at the center in the vehicle width direction of the light emission surface 12B; that is, in the vicinity of the optical axis C1, light is emitted from both sides of the reflecting surface. Therefore, the emitted light is split into two branches. On the contrary, in the Fr turn lamp 10 (vehicle lamp) according to the present embodiment, the reflecting surface 15 is extended (buried) starting from the vehicle width direction inner surface 12D at the side end of the first light guide 12 in the vehicle width direction. Therefore, ignoring the leakage light from the side surface of the first light guide 12, light flux which is gathered can be emitted from the light emission surface 12B.

Figure 6:
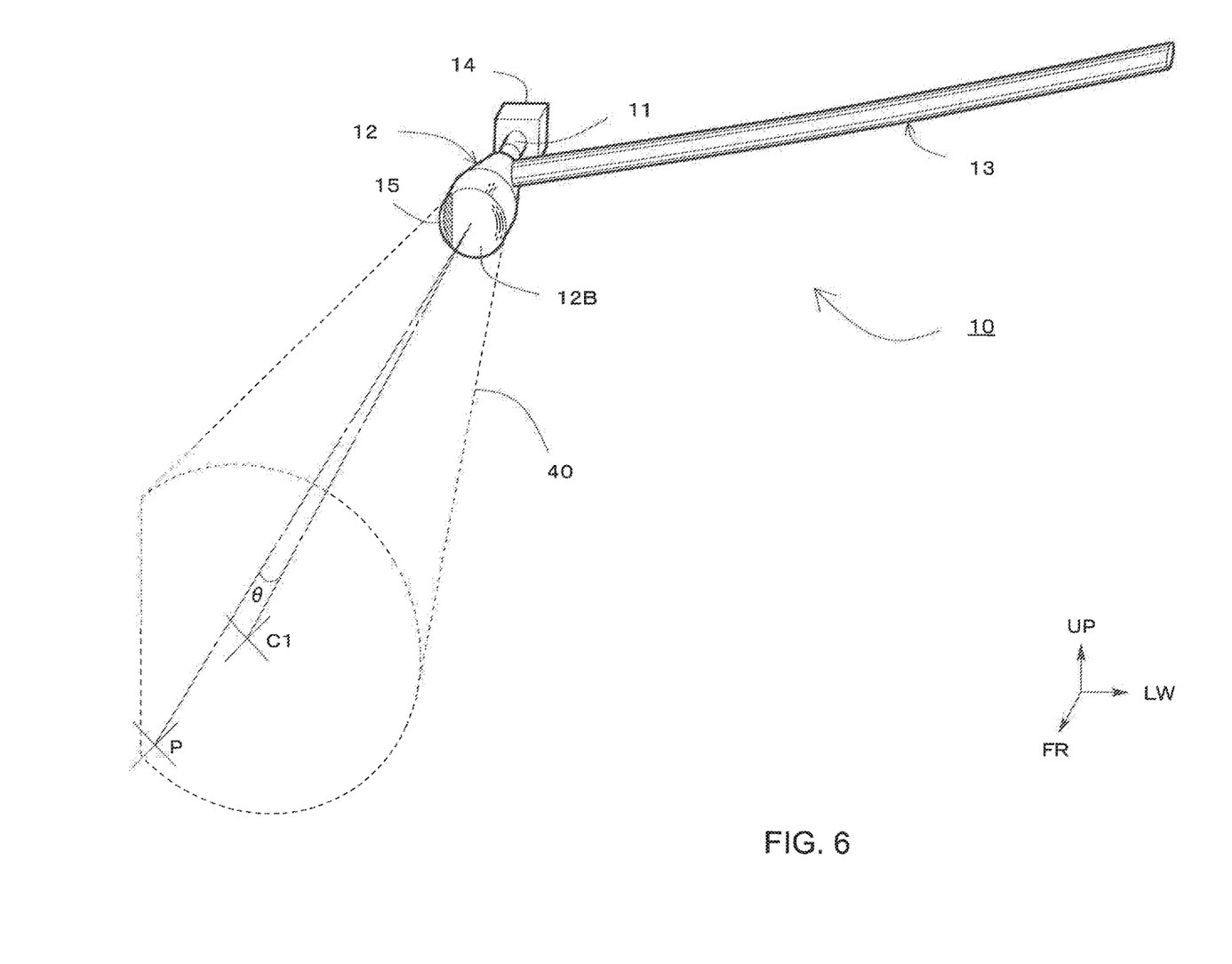
FIG. 6 is a view for explaining the shape of a light emission surface of a first light guide.

Meanwhile, a part of the light emission surface 12B is blocked by the reflecting surface 15. Therefore, as illustrated by FIG. 6, a "D-shaped" main light flux 40 with a partially missed circle may be emitted from the circular light emission surface 12B as viewed from the front. The first light guide 12 may be formed to satisfy the regulations even with such an irradiation pattern.

For example, as the regulations on Fr turn lamps, it is required that the light intensity [cd] at the measurement point P of a predetermined angle θ from the illumination center (optical axis C1) be not less than a predetermined value. Therefore, the arrangement of the reflecting surface 15 and the diameter of the light emission surface 12B and the like are determined so that the D-shaped light flux includes the measurement point P. For example, as illustrated in FIG. 4, in a sectional view taken along the line A-A, the arrangement is determined such that an effective emission width W1 of the light emission surface 12B and a blocked width W2 by the reflecting surface 15 are about 2:1 with respect to a diameter R1 of the light emission surface 12B.

The second light guide 13 extends in the vehicle width direction from a vehicle width direction outer side surface 12C of the first light guide 12 opposed, in the vehicle width direction, to the vehicle width direction inner surface 12D on which the reflecting surface 15 is provided. Similar to the first light guide 12, the second light guide 13 is a light guide made of a translucent material such as acrylic or quartz.

As illustrated in FIG. 3, the second light guide 13 is an elongated cylindrical member. By referring to FIG. 4, the second light guide 13 has a reflecting surface 13A provided at the rear in the vehicle longitudinal direction, a light emission surface 13B provided at the front in the vehicle longitudinal direction, the connection end 13C connected to the vehicle width direction outer side surface 12C of the first light guide 12, and an end face 13D (see FIG. 3) that is an extending end in the vehicle width direction. The second light guide 13 extends outward in the vehicle width direction from the connection end 13C to the end face 13D.

The reflecting surface 13A is formed over the entire length (entire width) of the second light guide 13 in the vehicle width direction. The reflecting surface 13A may have a corrugated shape as illustrated in FIG. 4 or may be a roughened surface which is subjected to sandblasting or the like. The light incident on the reflecting surface 13A is directed toward the light emission surface 13B that is an opposing surface, and the light whose incident light to the light emission surface 13B exceeds a critical angle is emitted from the light emission surface 13B without being returned (reflected) to the second light guide 13. Since the reflecting surface 13A is formed over the entire width, the second light guide 13 emits light over the entire width.

Figure 5:
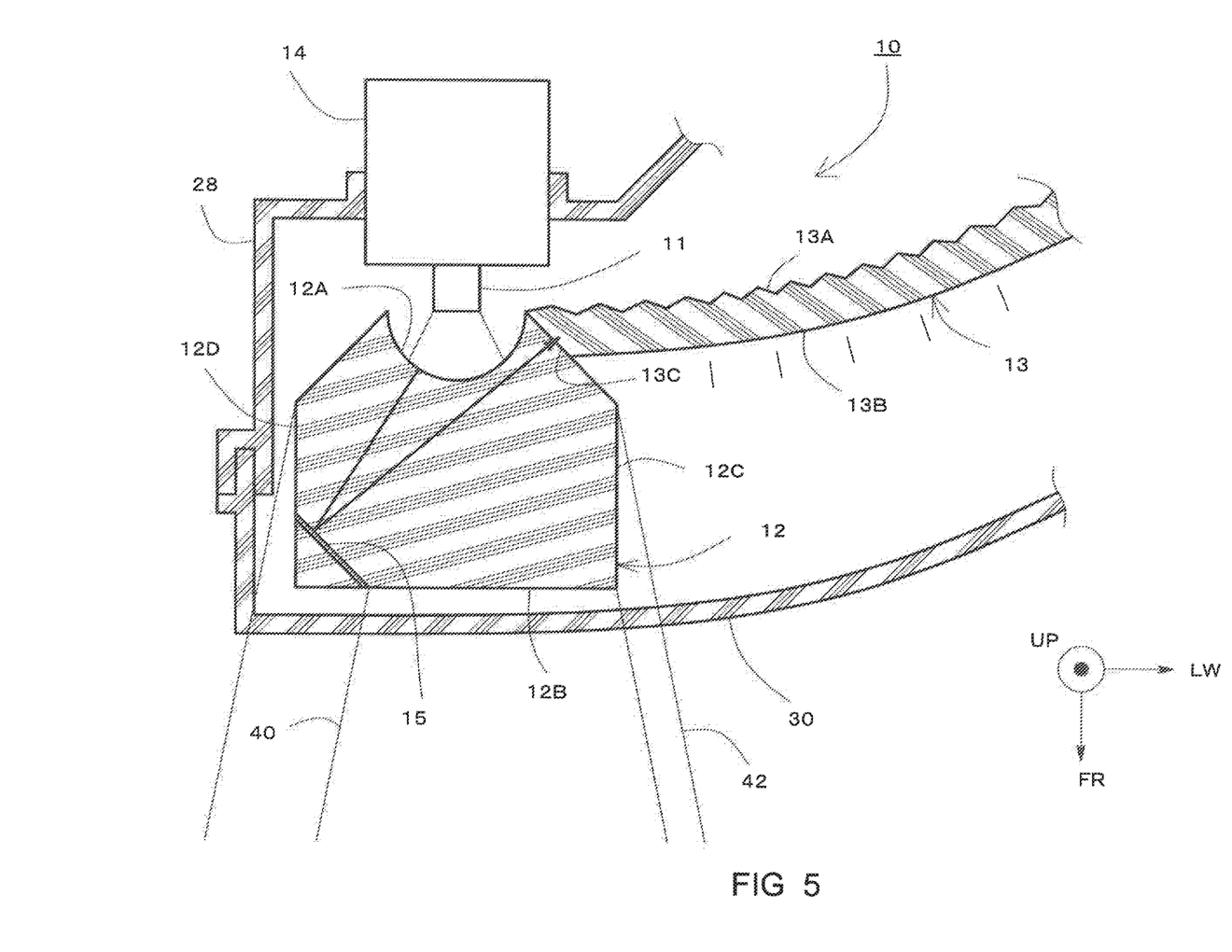

Further, the second light guide 13 is connected to the vehicle width direction outer side surface 12C of the first light guide 12 on the lens surface 12A side; that is, to the rear of the first light guide 12. By taking such an arrangement, the second light guide 13 is separated rearward from the outer lens 30 that is the foremost surface of the headlamp unit 20. Therefore, as compared with the case where the second light guide 13 is arranged in the vicinity of the outer lens 30, there is a disadvantage that the amount of light emission is small (dark) when viewed from the outside. On the other hand, as illustrated in FIG. 5, the second light guide 13 does not overlap with leakage light 42 from the first light guide 12. As a result, there is an advantage that the light is evenly (uniformly) emitted over the entire width of the second light guide 13 in the vehicle width direction.

FIG. 5 illustrates a state when the Fr turn lamp 10 according to the present embodiment is turned on. The light irradiated from the light source 11 is incident on the first light guide 12 while being diffused by the lens surface 12A. A part of the light incident on the first light guide 12 is reflected by the reflecting surface 15 and is incident on the second light guide 13 from the connection end 13C. In the second light guide 13, the light reflected by the reflecting surface 13A is emitted from the light emission surface 13B. Since the reflecting surface 13A is formed over the entire width of the second light guide 13 in the vehicle width direction, the second light guide 13 emits light over the entire width in the vehicle width direction.

On the other hand, the light which is not incident on the reflecting surface 15 is emitted as the main light flux 40 from the light emission surface 12B of the first light guide 12 forward in the vehicle longitudinal direction. Further, the leakage light 42 emitted from the side surface of the first light guide 12 is also emitted forward in the vehicle longitudinal direction.

<Another Example of the Present Embodiment>

Figure 7:
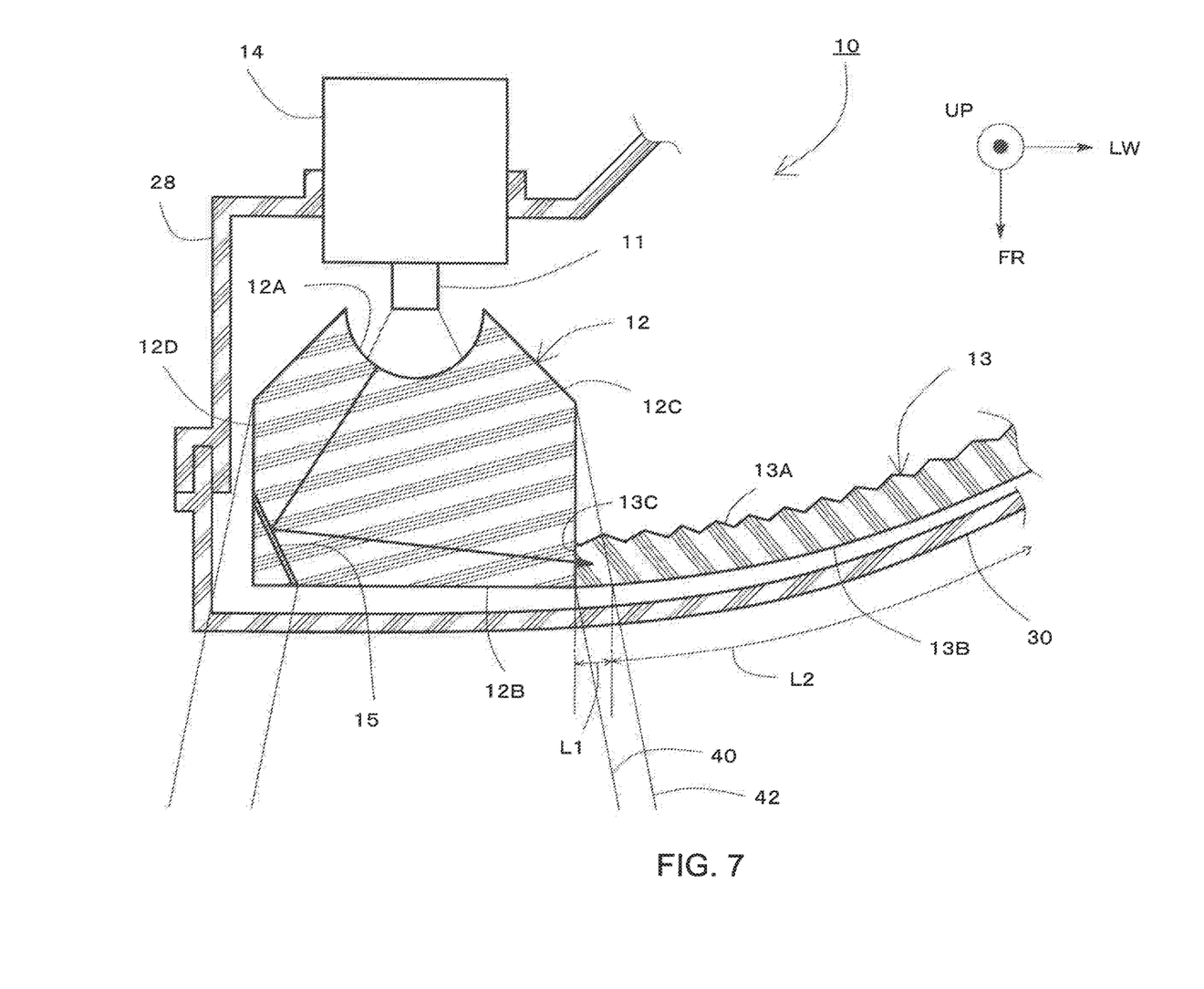
FIG. 7 is a sectional view taken along the line A-A, illustrating a vehicle lamp according to another example of the present embodiment.

FIG. 7 illustrates another example of the Fr turn lamp 10 (vehicle lamp) according to the present embodiment. FIG. 7 is different from FIG. 4 in that the second light guide 13 is connected to the vehicle width direction outer side surface 12C of the first light guide 12 on the light emission surface 12B side; that is, to the front of the first light guide 12.

As described above, in the above arrangement, an overlapping region L1 on which the light from the reflecting surface 15 and the leakage light 42 from the side surface 12C are incident in an overlapping manner is formed at the root of the second light guide 13; that is, at the portion close to the side surface 12C. Further, the outer side in the vehicle width direction from the overlapping region L1 is a single region L2 on which only the light from the reflecting surface 15 is incident. Thus, there is a disadvantage that the light intensity of the second light guide 13 varies depending on the position in the vehicle width direction. However, since the second light guide 13 is provided close to the outer lens 30 that is the foremost surface of the headlamp unit 20, there is an advantage that the second light guide 13 looks brighter when viewed from the outside, as compared with the case where the second light guide 13 is provided further rearward.

Meanwhile, the present disclosure is not limited to the above-described embodiments, but includes all changes and modifications without departing from the technical scope or essence of the present disclosure as defined by the claims.

The invention claimed is:

1. A vehicle lamp comprising:
    a light source which has an optical axis provided along a vehicle longitudinal direction;
    a first light guide which is disposed along the optical axis of the light source and along a vehicle longitudinal direction, the first light guide including: (i) a lens surface facing the light source in a direction of the optical axis, (ii) a first light emission surface that is formed on the side opposite the lens surface in the direction of the optical axis of the light source, and (iii) a first reflecting surface configured to reflect a part of an incident light from the light source; and
    a second light guide which has a connection end connected to a vehicle width direction outer side surface of the first light guide and extending outward in a vehicle width direction from the connection end, the second light guide including: (a) a second reflecting surface formed at a rear of the second light guide, and (b) a second light emission surface formed at a front of the second light guide, wherein
    the first reflecting surface of the first light guide reflects the part of the incident light from the light source toward the connection end of the second light guide.

2. The vehicle lamp according to claim 1, wherein the first reflecting surface is buried in the first light guide from the side end of the first light guide in the vehicle width direction.

3. The vehicle lamp according to claim 1, wherein the second light guide is connected to a side surface of the first light guide on a side of the lens surface.

4. The vehicle lamp according to claim 1, wherein the second light guide is connected to a side surface of the first light guide on a side of the first light emission surface.

5. The vehicle lamp according to claim 1, wherein the second light guide is connected to a side surface of the first light guide that receives the reflected part of the incident light from the first reflecting surface of the first light guide.

6. The vehicle lamp according to claim 1, wherein the second light guide extends outward from the vehicle width direction outer side surface of the first light guide in a direction that is opposite to a vehicle width direction inner surface on which the first reflecting surface is provided.

7. The vehicle lamp according to claim 1, wherein the first reflecting surface is provided at an angle having one end on the first light emission surface of the first light guide and another end on the vehicle width direction inner surface of the first light guide.

* * * * *